United States Patent
Shibata et al.

(10) Patent No.: US 12,225,446 B2
(45) Date of Patent: Feb. 11, 2025

(54) PERFORMING A CONTROL OPERATION TO SWITCH A PLURALITY OF COMMUNICATION PATHS

(71) Applicant: NIPPON TELEGRAPH AND TELEPHONE CORPORATION, Tokyo (JP)

(72) Inventors: Naotaka Shibata, Musashino (JP); Keita Takahashi, Musashino (JP); Jun Terada, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 374 days.

(21) Appl. No.: 17/768,120

(22) PCT Filed: Oct. 16, 2019

(86) PCT No.: PCT/JP2019/040671
§ 371 (c)(1),
(2) Date: Apr. 11, 2022

(87) PCT Pub. No.: WO2021/074999
PCT Pub. Date: Apr. 22, 2021

(65) Prior Publication Data
US 2023/0247517 A1   Aug. 3, 2023

(51) Int. Cl.
*H04W 40/12* (2009.01)
(52) U.S. Cl.
CPC .................. *H04W 40/12* (2013.01)
(58) Field of Classification Search
CPC ..... H04W 40/12; H04W 88/08; H04W 24/10; H04W 24/02; H04L 47/2408;
(Continued)

(56) References Cited

U.S. PATENT DOCUMENTS

| 2008/0068996 A1* | 3/2008 | Clave ................. H04W 8/005 370/230.1 |
| 2017/0244516 A1* | 8/2017 | Hikichi ................. H04L 5/0098 |

(Continued)

FOREIGN PATENT DOCUMENTS

| JP | 2009177739 | * | 8/2009 |
| JP | 2009177739 A | | 8/2009 |

(Continued)

OTHER PUBLICATIONS

IEEE Standards Association, IEEE Standard for Local and metropolitan area networks—Time-Sensitive Networking for Fronthaul, IEEE Std 802.1CM-2018, Jun. 8, 2018.

*Primary Examiner* — Mewale A Ambaye
(74) *Attorney, Agent, or Firm* — Harness, Dickey & Pierce, P.L.C.

(57) ABSTRACT

A signal transfer control apparatus that performs a control operation to switch a plurality of communication paths constituted by a plurality of signal transfer apparatuses transferring a signal includes: a fixed delay information acquisition unit that acquires fixed delay information for each of the plurality of communication paths; a traffic information acquisition unit that acquires traffic information indicating a traffic volume or each of the plurality of communication paths; a probability density function estimation unit that estimates a probability density function of a traffic volume of each of the plurality of communication paths based on the traffic information; an occurrence probability estimation unit that estimates an occurrence probability of variable delay in each of the plurality of communication paths based on the probability density function of each of the plurality of communication paths; a communication path calculation unit that performs a calculation for specifying a communication path which is highly likely to satisfy a predetermined delay condition based on the occur- (Continued)

rence probability of the variable delay in each of the plurality of communication paths and the fixed delay information for each of the plurality of communication paths; and a setting instruction unit that outputs a setting instruction for switching a transfer destination of a signal to at least any one of the signal transfer apparatuses so that the signal is transferred via the communication path specified by the calculation performed by the communication path calculation unit.

7 Claims, 7 Drawing Sheets

(58) Field of Classification Search
CPC . H04L 47/2416; H04L 45/308; H04L 45/302; H04L 45/00; H04L 47/10
See application file for complete search history.

(56) References Cited

U.S. PATENT DOCUMENTS

| | | | |
|---|---|---|---|
| 2021/0203396 A1* | 7/2021 | Ni | H04B 7/0408 |
| 2022/0269264 A1* | 8/2022 | Corbett | G05D 1/0022 |
| 2022/0309377 A1* | 9/2022 | Yu | G06F 17/11 |
| 2023/0026835 A1* | 1/2023 | Nakata | H04W 4/48 |

FOREIGN PATENT DOCUMENTS

| | | | |
|---|---|---|---|
| JP | 2010130436 | * | 6/2010 |
| JP | 2010130436 A | | 6/2010 |
| JP | 2011151752 | * | 8/2011 |
| JP | 2011151752 A | | 8/2011 |

* cited by examiner

PERFORMING A CONTROL OPERATION TO SWITCH A PLURALITY OF COMMUNICATION PATHS

CROSS-REFERENCE TO RELATED APPLICATIONS

This application is a 371 U.S. National Phase of International Application No. PCT/JP2019/040671, filed on Oct. 16, 2019. The entire disclosure of the above application is incorporated herein by reference.

TECHNICAL FIELD

The present invention relates to a signal transfer control apparatus and a signal transfer control method.

BACKGROUND ART

Networks constituting a cellular system include mobile fronthaul (MFH), mobile backhaul (MBH), etc.

The MBH is a network between a base station and an aggregate station that controls the base station and is constituted by a layer 2 switch, a router, etc.

The MPH is a network between a radio control apparatus and a wireless device when the base station has a configuration in which the radio control apparatus and the wireless device are separately provided.

Conventionally, a point-to-point connection has been used for this section. However, the MPH has been examined to be networked with a configuration in which layer 2 switches are connected in multiple stages (see Non Patent Literature 1), and this realizes a higher redundancy, compared with the point-to-point connection.

CITATION LIST

Non Patent Literature

[NPL 1] "IEEE Standard for Local and metropolitan area networks-Time-Sensitive Networking for Fronthaul", IEEE Standards Association, 2018

SUMMARY OF THE INVENTION

Technical Problem

However, in the MFH, for example, the cycle in which delay can fluctuate may be shorter than the conventional cycle. This causes an issue that the average value of traffic to be accommodated needs to be set to a sufficiently small value in the MPH to avoid an occurrence of variable delay.

It is an object of the present invention to provide a signal transfer control apparatus and a signal transfer control method capable of efficiently reducing delay even when the delay may fluctuate in a short cycle.

Means for Solving the Problem

According to one aspect of the present invention, a signal transfer control apparatus that performs a control operation to switch a plurality of communication paths constituted by a plurality of signal transfer apparatuses transferring a signal includes: a fixed delay information acquisition unit that acquires fixed delay information for each of the plurality of communication paths; a traffic, information acquisition unit that acquires traffic information indicating a traffic volume of each of the plurality of communication paths; a probability density function estimation unit that estimates a probability density function of a traffic volume of each of the plurality of communication paths based on the traffic information; an occurrence probability estimation unit that estimates an occurrence probability of variable delay in each of the plurality of communication paths based on the probability density function of each of the plurality of communication paths; a communication path calculation unit that performs a calculation for specifying a communication path which is highly likely to satisfy a predetermined delay condition based on the occurrence probability of the variable delay in each of the plurality of communication paths and the fixed delay information for each of the plurality of communication paths; and a setting instruction unit that outputs a setting instruction for switching a transfer destination of a signal to at least any one of the signal transfer apparatuses so that the signal is transferred via the communication path specified by the calculation performed by the communication path calculation unit.

In addition, according to one aspect of the present invention, a signal transfer control apparatus that performs a control operation to switch a plurality of communication paths constituted by a plurality, of signal transfer apparatuses transferring a signal includes: a fixed delay information acquisition unit that acquires fixed delay information for each of the plurality of communication paths; a traffic information acquisition unit that acquires traffic information indicating a traffic volume of each of the plurality of communication paths a probability density function estimation unit that estimates a probability density function of a traffic volume of each of the plurality of communication paths based on the traffic information; a variable delay value estimation unit that estimates a variable delay value in each of the plurality of communication paths based on the probability density function of each of the plurality of communication paths and predetermined burst length information; a communication path calculation unit that performs a calculation for specifying a communication path which satisfies a predetermined delay condition based on the variable delay value in each of the plurality of communication paths and the fixed delay information for each of the plurality of communication paths; and a setting instruction unit that outputs a setting instruction for switching a transfer destination of a signal to at least any one of the signal transfer apparatuses so that the signal is transferred via the communication path specified by the calculation performed by the communication path calculation unit.

In addition, according to one aspect of the present invention, a signal transfer control method for performing a control operation to switch a plurality of communication paths constituted by a plurality of signal transfer apparatuses transferring a signal includes: a fixed delay information acquisition process that acquires fixed delay information for each of the plurality of communication paths; a traffic information acquisition process that acquires traffic information indicating a traffic volume of each of the plurality of communication paths; a probability density function estimation process that estimates a probability density function of a traffic volume of each of the plurality of communication paths based on the traffic information; an occurrence probability estimation process that estimates an occurrence probability of variable delay in each of the plurality of communication paths based on the probability density function of each of the plurality of communication paths; a communication path calculation process that performs a calculation for specifying a communication path which is highly likely to satisfy a predetermined delay condition based on the occurrence probability of the variable delay in each of the plurality of communication paths and the fixed delay information for each of the plurality of communication paths; and a setting instruction process that outputs a setting instruction for switching a transfer destination of a signal to at least any one of the signal transfer apparatuses so that the signal is transferred via the specified communication path.

In addition, according to one aspect of the present invention, a signal transfer control method for performing a control operation to switch a plurality of communication paths constituted by a plurality of signal transfer apparatuses transferring a signal includes: a fixed delay information acquisition process that acquires fixed delay information for each of the plurality of communication paths; a traffic information acquisition process that acquires traffic information indicating a traffic volume of each of the plurality of communication paths; a probability density function estimation process that estimates a probability density, function of a traffic volume of each of the plurality of communication paths based on the traffic information; a variable delay value estimation process that estimates a variable delay value in each of the plurality of communication paths based on the probability density function of each of the plurality of communication paths and predetermined burst length information; a communication path calculation process that performs a calculation for specifying a communication path which satisfies a predetermined delay condition based on the variable delay value in each of the plurality of communication paths and the fixed delay information for each of the plurality of communication paths; and a setting instruction process that outputs a setting instruction for switching a transfer destination of a signal to at least any one of the signal transfer apparatuses so that the signal is transferred via the specified communication path.

DESCRIPTION OF EMBODIMENTS

First, the background leading to the present invention will be described. For example, as a signal transfer system including a plurality of signal transfer apparatuses, there is a network in which a signal transfer control apparatus controls a plurality of signal transmission paths via the plurality of signal transfer apparatuses. First, such a network will be described.

Figure 5:
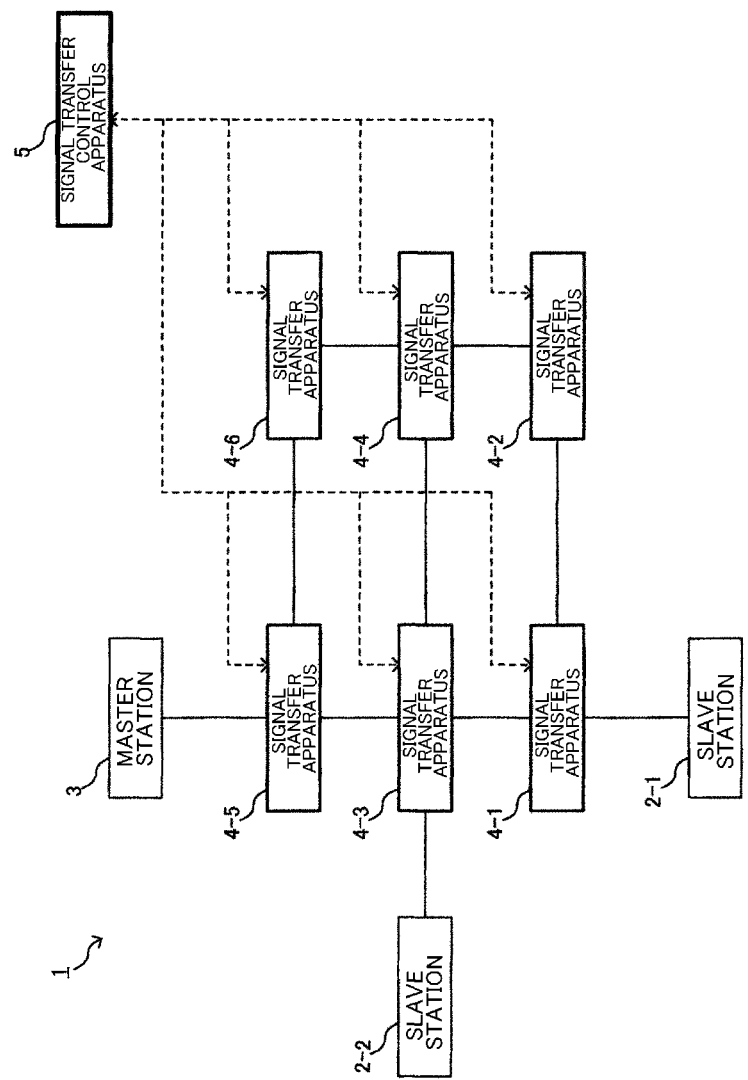
FIG. 5 illustrates a configuration example of a signal transfer system.

FIG. 5 illustrates a configuration example of a signal transfer system 1. The signal transfer system 1 includes, for example, slave stations 2-1 and 2-2, a master station 3, signal transfer apparatuses 4-1 to 4-6, and a signal transfer control apparatus 5. While the example illustrated in FIG. 5 includes six signal transfer apparatuses and two slave stations, the present invention is not limited to such a configuration. In addition, when any one of the plurality of components such as the signal transfer apparatuses 4-1 to 4-6, does not need to be specified, the component is simply referred to as, for example, the signal transfer apparatus Each of the slave stations 2 performs communication with a wireless terminal. The master station 3 controls the slave stations 2. Each of the signal transfer apparatuses 4-1 to 4-6 transfers a signal between each of the slave stations 2-1 and 2-2 and the master station 3. For example, each of the signal transfer apparatuses 4-1 to 4-6 is a layer 2 switch, a router, or the like.

The signal transfer control apparatus 5 controls communication paths between each of the slave stations 2-1 and 2-2 and the master station 3 by controlling the signal transfer apparatuses 4-1 to 4-6. The signal transfer system 1 includes a plurality of communication paths through each of which a signal is transferred between each of the slave stations 2-1 and 2-2 and the station 3.

For example, when the signal transfer system is a ring-type network system, there are two types of communication paths, which are a clockwise path and a counter-clockwise path. When the signal transfer system is a mesh-type or honeycomb-type network system, there are two or more types of communication paths.

Thus, in the signal transfer system 1, the signal transfer control apparatus 5 determines one communication path for each of the communications between the slave stations 2-1 and 2-2 and the master station 3 by controlling a transfer destination (output destination) of each of the signal transfer apparatuses 4-1 to 4-6.

Examples of the method for controlling the communication. paths by the signal transfer control apparatus 5 include a method in which a communication path with a small number of hops is allocated to each communication and a method in which a communication path with the minimum cost value is allocated to each communication.

In addition, the signal transfer control apparatus 5 may switch the communication path that has been determined once to another communication path. A possible trigger for switching the communication path may be an increase in required bandwidth, a cable construction in a specific section, a change of the installation location of the master station 3 to be connected to, or the like.

The signal transfer system 1 is applicable to both. MFH and MBH. When the signal transfer system 1 is MFH, the slave stations 2-1 and 2-7 correspond to the wireless devices, and the master station 3 corresponds to the radio control apparatus. When the signal transfer system 1 is MBH, the slave stations 2-1 and 2-2 correspond to the base stations, and the master station 3 corresponds to the aggregate station.

Traffic for which the maximum value of allowable delay is set to be smaller than that of the other signals, such as video and audio, and traffic for which an allowable delay value is set to be relatively larger, such as file transfer or the like, flow between the slave stations 2-1 and 2-2 and the master station 3.

Figure 6:
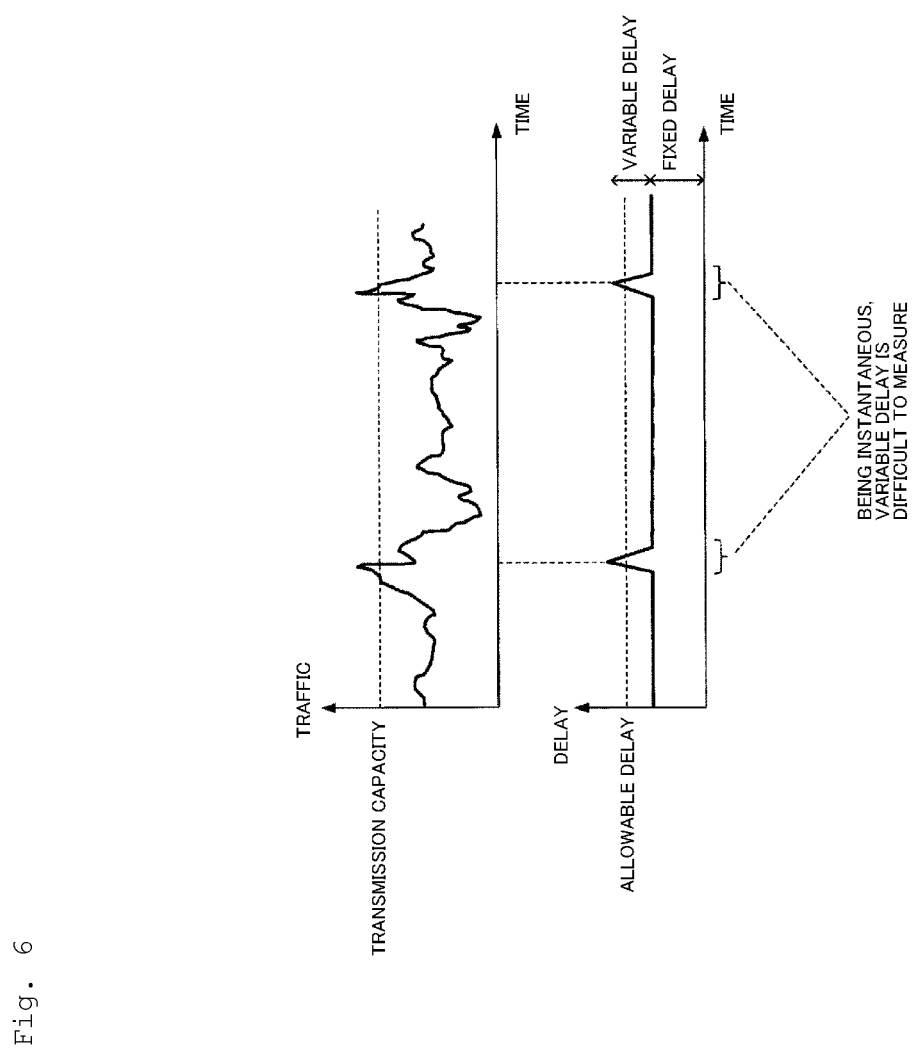
FIG. 6 illustrates allowable delay, fixed delay, and variable delay.

The delays that occur in the signal transfer apparatuses 4-1 to 4-6 are roughly classified into a fixed delay that does not fluctuate and a variable delay that fluctuates while the signal transfer system 1 is in operation (see FIG. 6).

The fixed delay includes an internal delay that occurs until the signal input to the signal transfer apparatus 4 is output. In addition, a transmission delay caused by, for example, optical fiber transmission occurs between one signal transfer apparatus 4 and another signal transfer apparatus 4. Since this transmission delay depends on the transmission distance, the transmission delay may be classified as the fixed delay.

The variable delay includes a collision delay that occurs when a plurality of packets arrives at the signal transfer apparatus 4 at approximately the same time and is made to wait until the other packets are processed, a congestion delay that occurs when the input amount to the signal transfer apparatus 4 exceeds the output amount, etc.

In the uplink of the signal transfer system 1, when the signal transfer apparatus 4 has an input/output interface of 10 Gbps and the slave stations 2-1 and 2-2 transmit a frame of 1500 bytes, a collision delay that occurs when two frames arrive at the same time is approximately 1.2 μs.

In contrast, when signals of 6 Gbps flow from the slave stations 2-1 and 2-2 for 1 ms and these signals reach the signal transfer apparatus 4-3 at the same time, signals of 12 Gbps temporarily continue to arrive for 1 ms. This causes a congestion delay of approximately 200 μs, which is significantly greater than the collision delay. Thus, hereinafter, the congestion delay will be regarded as the variable delay.

Figure 7:
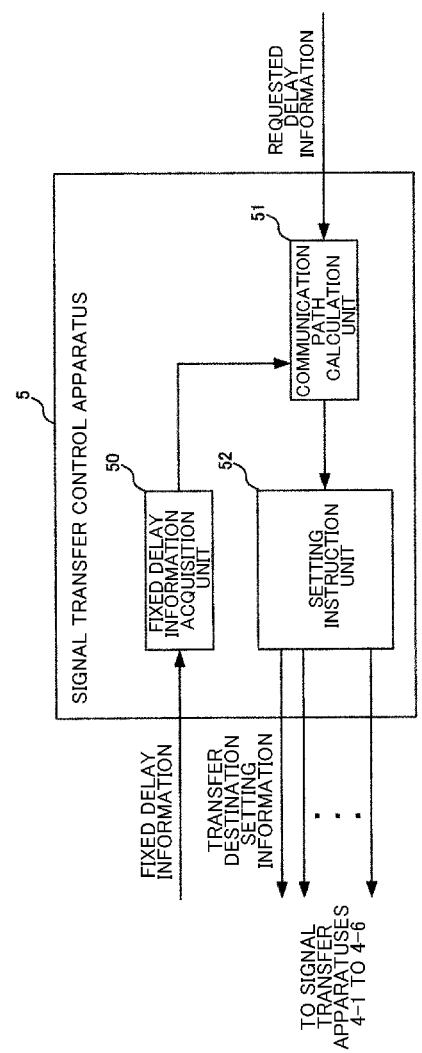
FIG. 7 illustrates a configuration example of a signal transfer control apparatus.

Next, a specific example of a configuration of the signal transfer control apparatus 5 will be described. FIG. 7 illustrates a configuration example of the signal transfer control apparatus 5. As illustrated in FIG. 7, the signal transfer control apparatus 5 includes a fixed delay information acquisition unit 50, a communication path calculation unit 51, and a setting instruction unit 52.

The fixed delay information acquisition unit 50 acquires fixed delay information for each of the plurality of communication paths each of which is constituted by a combination of the signal transfer apparatuses 4-1 to 4-6 and outputs the acquired fixed delay information to the communication path calculation unit 51.

The communication path calculation unit 51 performs a calculation for specifying a communication path based on a maximum value of the delay allowed for each traffic flow and outputs the calculation result to the setting instruction unit 52. Hereinafter, the maximum value of the delay allowed for each traffic flow will be referred to as requested delay information requested in the signal transfer system 1.

The setting instruction unit 52 outputs a setting instruction (switching instruction) for switching a transfer destination of a signal to each of the signal transfer apparatuses 4-1 to 4-6 so that the signal is transferred via the communication path specified by the calculation performed by the communication path calculation unit 51.

Fixed delay time between the slave station 2 and the master station 3 is classified into four types, as described in (a) to (d) below, for example.
 (a) Delay time between the slave station 2 and the signal transfer apparatus 4
 (b) Delay time obtained by multiplying the number of signal transfer apparatuses 4 passed through in the communication path by delay time per signal transfer apparatus 4
 (c) Delay time in accordance with a transmission distance between one signal transfer apparatus 4 and another signal transfer apparatus 4
 (d) Delay time between the signal transfer apparatus 4 and the master station 3

The delay time (a) and (d) are delays between the apparatuses included in the same base (area) and are negligibly smaller values compared with the delay time (b) and (c).

The delay time (b) can be calculated by measuring delay time per signal transfer apparatus 4 in advance.

The delay time (c) can be calculated by acquiring information about the transmission distance between the bases where the signal transfer apparatuses 4 are installed.

In practice, some measurement error occurs in the value of (c). In addition, some errors also occur due to (a) and (d) However, the errors due to (a) and (d) are an extremely small value compared with the error of (c) caused by a distance of approximately several tens of kilometers between the bases. Therefore, if a slight margin is added to the value of (c) that has been calculated once, such errors will not cause any problem.

However, in 5G (the fifth-generation mobile communication system), various applications are envisioned. For example, an application that requires low latency requests for a delay time of several milliseconds or less for end-to-end.

With regard to this low latency requirement, it has been considered to reduce the fixed delay by, for example, providing a core apparatus locally. Hereinafter, efficiently reducing the variable delay will be considered.

For example, in 5G MPH, it is assumed that the traffic has a burst property with a cycle of 1 ms. Further, bursts, also referred to as microbursts, could occur in a similar time period in IoT devices, which are expected to be widespread in the age of 5G. Accordingly, the variable delay can occur in a time period on the order of ms.

However, the delay is usually measured in a cycle of a second or more. In addition, in a case where the delay is measured on the order of ms, packets for measuring the delay need to be inserted at intervals of ms. This leads to a decrease in network efficiency.

When the delay is measured in a cycle of a second or more the variable delay that occurs in a time period on the order of ms cannot be measured. Therefore, the average value of traffic to be accommodated conventionally needs to be set to a sufficiently small value so that the variable delay does not occur. This causes a decrease in the volume of traffic that can be accommodated by the signal transfer system.

In addition, when the signal transfer system measures the delay in a cycle of a second or more, even if the traffic increases its speed after being accommodated and the variable delay occurs, this signal transfer system cannot detect or handle the variable delay of a short cycle. That is, there has been an issue of not being able to meet the requested delay for a traffic flow in which the maximum value of the allowable delay is small (the requested delay is strict).

Next, a signal transfer system capable of efficiently reducing delay even when the delay may fluctuate in a short cycle will be described.

Figure 1:
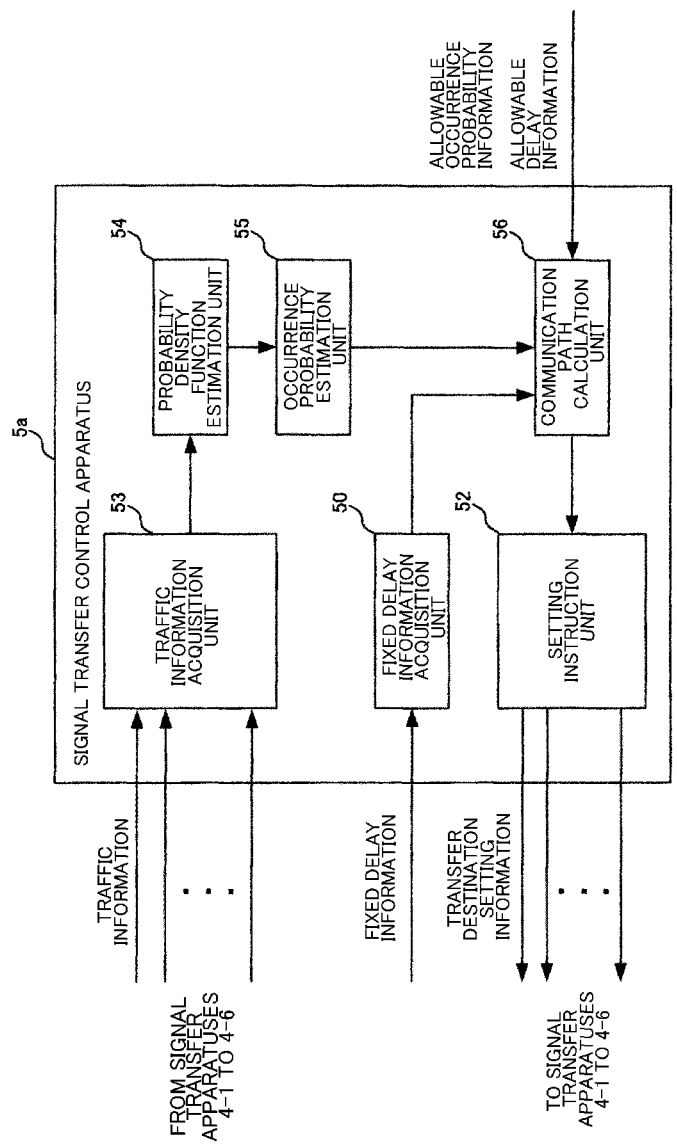
FIG. 1 illustrates a configuration example of a signal transfer control apparatus according to an embodiment.

FIG. 1 illustrates a configuration example of a signal transfer control apparatus (signal transfer control apparatus 5a) according to an embodiment. The signal transfer control apparatus 5a is provided in place of the signal transfer control apparatus 5 in the signal transfer system 1 illustrated in FIG. 5, for example, and controls the signal transfer apparatuses 4-1 to 4-6.

As illustrated in FIG. 1, the signal transfer control apparatus 5a includes a fixed delay information acquisition unit 50, a setting instruction unit 52, a traffic information acquisition unit 53, a probability density function estimation unit 54, an occurrence probability estimation unit 55, and a communication path calculation unit 56. In the signal transfer control apparatus 5a, the same reference numerals are given to the constituent elements approximately the same as those of the signal transfer control apparatus 5 illustrated in FIG. 7.

The traffic information acquisition unit 53 acquires traffic information about each of the plurality of communication paths and outputs the acquired traffic information to the probability density function estimation unit 54.

The probability density function estimation unit 54 models the traffic based on the traffic information acquired by the traffic information acquisition unit 53, estimates a probability density function of a traffic volume of each of the plurality of communication paths, and outputs the estimated probability density functions to the occurrence probability estimation unit 55.

The occurrence probability estimation unit 55 estimates an occurrence probability of variable delay in each of the plurality of communication paths, based on the probability density function of each of the plurality of communication paths estimated by the probability density function estimation unit 54, and outputs the estimation results to the communication path calculation unit 56.

The communication path calculation unit 56 performs a calculation for specifying a communication path, based on the occurrence probability of the variable delay in each of the plurality of communication paths estimated by the communication path calculation unit 56 and the fixed delay information for each of the plurality of communication paths acquired by the fixed delay information acquisition unit 50, and outputs the calculation result to the setting instruction unit 52.

More specifically, the communication path calculation unit 56 extracts a communication path whose fixed delay is smaller than the allowable delay (requested delay) for each traffic flow. In addition, when the occurrence probability of the variable delay in a traffic flow exceeds the occurrence probability of the allowable variable delay, the communication path calculation unit 56 performs a calculation for newly specifying a communication path so as to change the communication path corresponding to the traffic flow or at least one of the other traffic flows that pass through the same communication path as that of the traffic flow.

That is, the communication path calculation unit 56 performs a calculation for specifying a communication path that is highly likely to satisfy a predetermined delay condition, based on the occurrence probability of the variable delay in each of the plurality of communication paths and the fixed delay information for each of the plurality of communication paths.

The setting instruction unit 52 then outputs a setting instruction (switching instruction) for switching the transfer destination of a signal to each of the signal transfer apparatuses 4-1 to 4-6 so that the signal is transferred via the communication path specified by the calculation performed by the communication path calculation unit 56.

Figure 2:
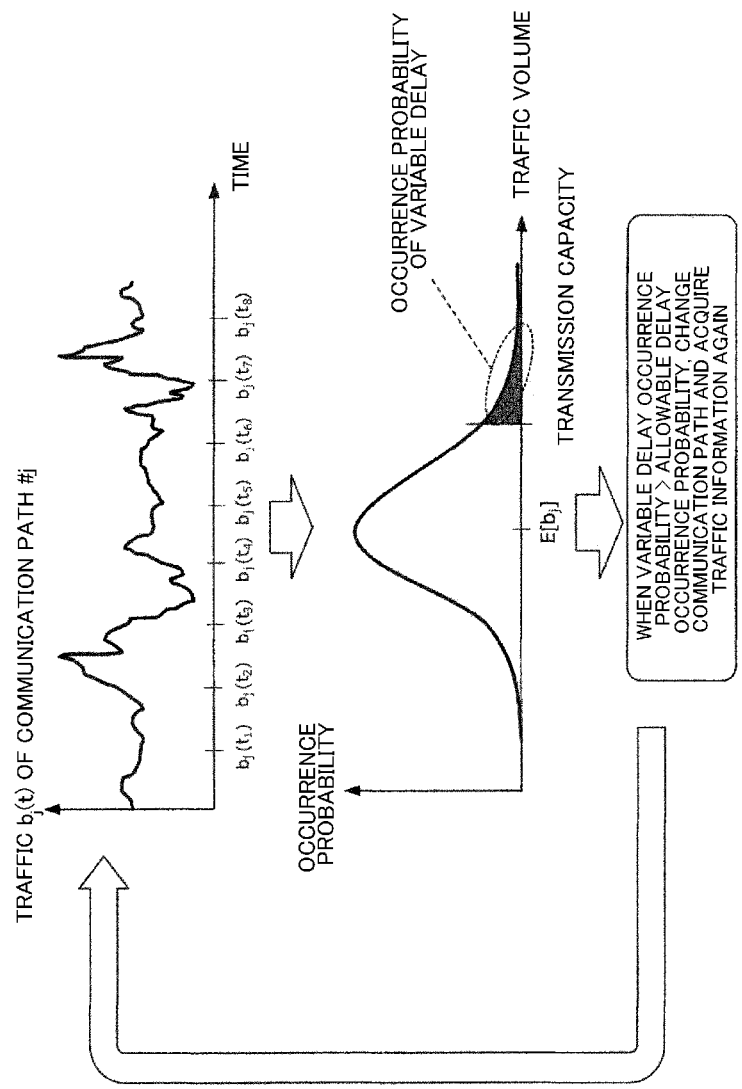
FIG. 2 illustrates an outline of an operation of the signal control apparatus according to an embodiment.

Next, an operation example of the signal transfer control apparatus 5*a* will be described with reference to FIG. 2. FIG. 2 illustrates an outline of an operation of the signal transfer control apparatus 5*a*.

The traffic information acquisition unit 53 collects information about traffic that flows through each communication path for a predetermined period. of time. For example, the traffic information acquisition unit 53 acquires traffic $(b_j(t_1), b_j(t_2), b_j(t_3), \ldots)$ in a communication path #j.

The probability density function estimation unit 54 models traffic based on the traffic information acquired by the traffic information acquisition unit 53 and estimates a probability, density function of a traffic volume of each of the plurality of communication paths. For example, the probability density function estimation unit 54 models the traffic volume with a normal distribution and estimates a probability density function $(p(b_j))$.

Next, the occurrence probability estimation unit 55 estimates an occurrence probability of the variable delay, which is expressed by the following formula (1) based on the probability density function.

$$\text{occurrence probability of variable delay} = \int_{transmission\ capacity} p(b_j)) \qquad (1)$$

For example, when the communication path calculation unit 56 determines that there is a traffic flow having an occurrence probability of the variable delay that exceeds the occurrence probability of the allowable delay, the communication path calculation unit 56 performs a calculation for newly specifying a communication path so as to change the communication path corresponding to the traffic flow or at least one of the other traffic flows that pass through the same communication path as that of the traffic flow so that the variable delay is reduced.

To newly select and specify a communication path by the communication path calculation unit 56, the following criteria may be defined.

For example, the communication path calculation unit 56 may be configured to select and specify a communication path having the smallest average traffic volume or a communication path having the lowest occurrence probability of the variable delay among the communication paths that can be simply selected.

Alternatively, the communion path calculation unit 56 may utilize additivity in which, when there are two traffic volumes each having a mean value and a variance, and when these traffic volumes are combined, the mean of the combined traffic volumes is equal to the sum of the means of the two respective traffic volumes, and likewise, the variance of the combined traffic volumes is equal to the sum of the variances of the two respective traffic volumes. That is, the communication path calculation unit 56 may perform a calculation for specifying a communication path based on the additivity of the mean and variance of traffic volumes indicated in the traffic information acquired by the traffic information acquisition unit 53.

In this operation, by using the mean and variance of the traffic volume of the traffic flow for which the communication path is to be changed, the signal transfer control apparatus 5*a* can estimate a probability density function and an occurrence probability of the variable delay for when the traffic flow is changed. Here, the traffic flow for which the communication path is to be changed and the probability density function of the traffic of the communication path after the chance are assumed to follow a similar model.

Thus, the signal transfer control apparatus 5*a* estimates the probability density function and the occurrence probability, of the variable delay after the traffic flow is changed. When the occurrence probability of the variable delay is lower than the occurrence probability of allowable delay, the signal transfer control apparatus 5*a* considers switching the communication path to a communication path having a low occurrence probability of the variable delay.

Here, if the signal transfer control apparatus 5*a* determines that there is no communication path having an occurrence probability of the variable delay equal to or lower than the occurrence probability of the allowable delay, the signal transfer control apparatus 5*a* does not change the communication path.

The traffic information acquisition unit 53 acquires traffic information for each signal transfer apparatus 4 by periodically receiving information about the traffic counted by a frame counter provided in an output port of each of the signal transfer apparatuses 4, for example.

Next, the signal transfer control apparatus 5a checks connection information between one signal transfer apparatuses 4 and the other signal transfer apparatuses 4, and specifies the signal transfer apparatuses 4 included in each of the communication paths.

The traffic information acquisition unit 53 outputs, for example, all the individual traffic information for the signal transfer apparatuses 4 to the probability density function estimation unit 54. In this case, the occurrence probability estimation unit 55 estimates the occurrence probabilities of the variable delay based on the probability density functions of all the communication paths.

For example, assuming that the occurrence probability of the variable delay in the signal transfer apparatus 4-3 is $p_1$ and the occurrence probability of the variable delay in the signal transfer apparatus 4-5 is $p_2$ in the signal transfer system 1 illustrated in FIG. 5. In this case, the occurrence probability of the variable delay, in the communication path including the signal transfer apparatuses 4-3 and 4-5 is $1-(1-p_1) \cdot (1-p_2)$.

In addition, as in the signal transfer system 1, when there is only one master station 3, the signal transfer apparatus 4-5, which is arranged upstream of the master station 3, has the largest traffic volume. In this case, the traffic information acquisition unit 53 may output only the traffic information about the signal transfer apparatus 4 which is located on the communication path including the signal transfer apparatus 4-5 and whose average output traffic volume is the largest to the probability density function estimation unit 54 as the traffic information.

Alternatively, the traffic information acquisition unit 53 may be configured as described below so as to acquire only the traffic information about the traffic flow for which the communication path is to be changed. That is, the traffic information acquisition unit 53 may be configured to receive only the traffic information counted by the frame counter provided in the input port of the signal transfer apparatus 4 to which the relevant traffic flow is first input.

As described above, when the occurrence probability of the variable delay exceeds, for example, the occurrence probability of the allowable variable delay, the signal transfer system 1 having the signal transfer control apparatus 5a changes the communication path so that the accommodation efficiency is improved, and the low latency of the traffic flow is secured. Furthermore, the signal transfer system 1 is capable of efficiently reducing delay even when the delay may fluctuate in a short cycle.

Figure 3:
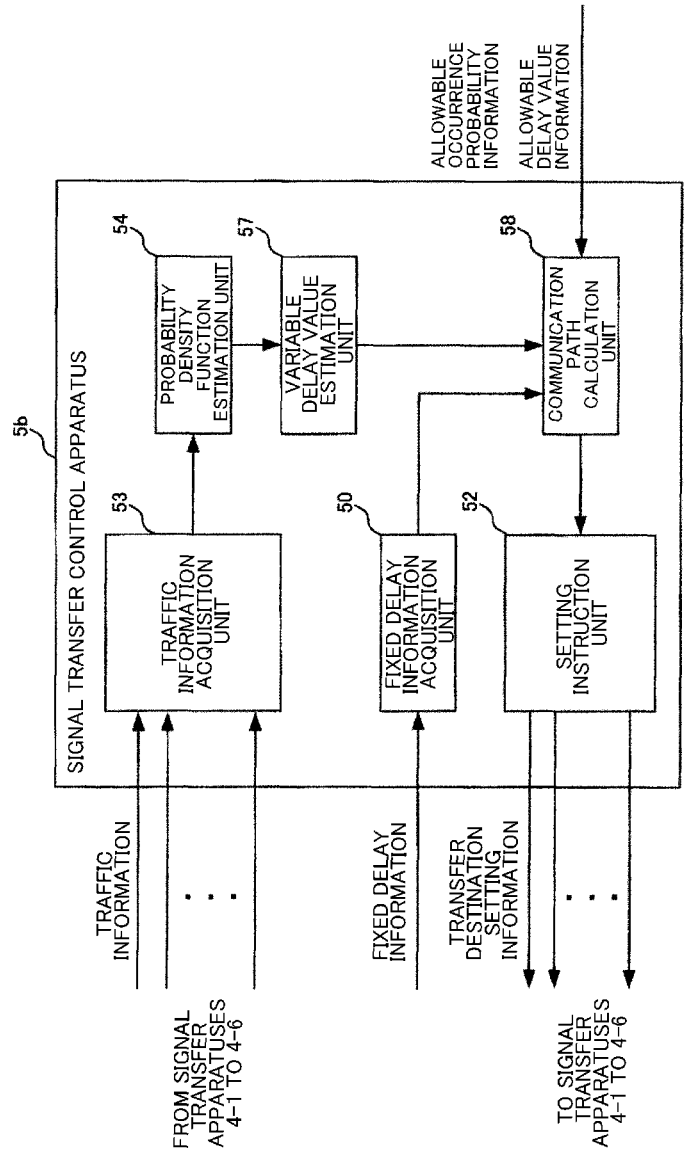
FIG. 3 illustrates a configuration example of a different signal transfer control apparatus according to an embodiment.

Next, a configuration example of a different signal transfer control apparatus according to an embodiment. FIG. 3 illustrates a configuration example of a different signal transfer control apparatus (a signal transfer control apparatus 5b) according to an embodiment. The signal transfer control apparatus 5b is provided in place of the signal transfer control apparatus 5 in the signal transfer system 1 illustrated in FIG. 5, for example, and controls the signal transfer apparatuses 4-1 to 4-6.

As illustrated in FIG. 3, the signal transfer control apparatus 5b includes a fixed delay information acquisition unit 50, a setting instruction unit 52, a traffic information acquisition unit 53, a probability density function estimation unit 54, a variable delay value estimation unit 57, and a communication path calculation unit 58. In the signal transfer control apparatus 5b, the same reference numerals are given to the constituent elements approximately the same as those of the signal transfer control apparatus 5a illustrated in FIG. 1.

The variable delay value estimation unit 57 estimates an occurrence probability of variable delay and a variable delay value in each of the plurality of communication paths, based on a probability density function of each of the plurality of communication paths estimated by the probability density function estimation unit 54, and outputs the estimation results to the communication path calculation unit 58.

The variable delay value estimation unit 57 may estimate a variable delay value in each of the plurality of communication paths, based on the probability density function of each of the plurality of communication paths and predetermined burst length information.

The communication path calculation unit 58 performs a calculation for specifying a communication path, based on the occurrence probability of the variable delay and the variable delay value in each of the plurality of communication paths estimated by the variable delay value estimation unit 57 and fixed delay information (a fixed delay value) for each of the plurality of communication paths acquired by the fixed delay information acquisition unit 50, and outputs the calculation result to the setting instruction unit 52.

The communication path calculation unit 58 may perform a calculation for specifying a communication path that satisfies a predetermined delay condition, based on the variable delay value in each of the plurality of communication paths and the fixed delay information for each of the plurality of communication paths.

More specifically, the variable delay value estimation unit 57 extracts a communication path having a fixed delay smaller than the allowable delay (requested delay) for each traffic flow. In addition, when the sum value of the fixed delay value and the variable delay value for a traffic flow exceeds the allowable variable delay value, the variable delay value estimation unit 57 performs a calculation for newly specifying a communication path so as to change the communication path corresponding to the traffic flow or at least one of the other traffic flows that pass through the same communication path as that of the traffic flow.

The setting instruction unit 52 then outputs a setting instruction (switching instruction) for switching the transfer destination of a signal to each of the signal transfer apparatuses 4-1 to 4-6 so that the signal is transferred via the communication path specified by the calculation performed by the communication path calculation unit 58.

Figure 4:
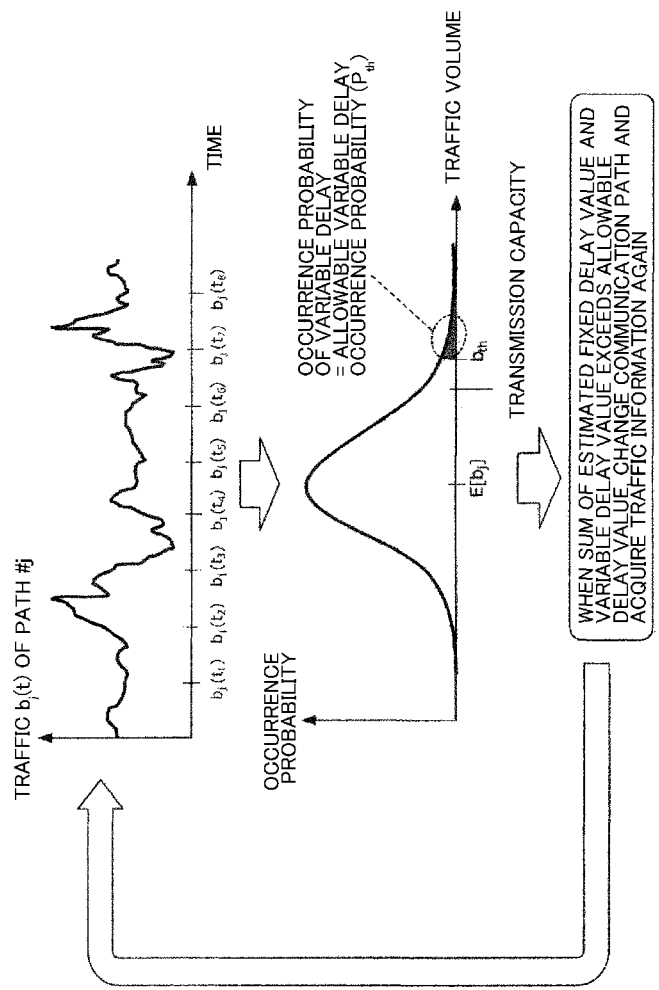
FIG. 4 illustrates an outline of an operation of the different signal transfer control apparatus according to an embodiment.

Next, an operation example of the signal transfer control apparatus 5b will be described with reference to FIG. 4. FIG 4 illustrates an outline of an operation of the signal transfer control apparatus 5b.

First, the variable delay value estimation unit 57 estimates $b_{th}$ [Gbps] expressed by the following formula (2), in which the occurrence probability of the allowable variable delay is represented by $p_{th}$.

$$\int p(b_j > b_{th}) = p_{th} \quad (2)$$

A possible variable delay value is expressed by the following formula (3), in which an output speed (transmission capacity) of the signal transfer apparatus 4 is represented by f [Gbps], and a time period (for example, a burst length) in which instantaneous traffic exceeds the transmission capacity is represented by $t_b$ [s].

$$\text{variable delay value} = (b_{th} - f) t_b / f \quad (3)$$

For example, assuming that $b_{th}$ is 15 Gbps, f is 10 Gbps, and $t_b$ is 1 ms, the variable delay that occurs is 500 μs.

While, in this example, the traffic volume is assumed to be always $b_{th}$ during the burst period, an actual traffic volume may fluctuate such that the traffic volume exceeds f, increases up to $b_{th}$, and then decreases to f. The variable delay value estimation unit 57 may estimate the variable delay value based on this fluctuation.

For example, when the traffic volume linearly increases from the beginning of a burst to the middle of the burst to reach $b_{th}$ and then linearly decreases until the end of the burst, a possible variable delay value is expressed by the following formula (4).

$$\text{variable delay value}=(b_{th}-f)t_b/2f \quad (4)$$

That is, assuming that $b_{th}$ is 15 Gbps, f is 10 Gbps, and $t_b$ is 1 ms, the variable delay that occurs is 250 μs.

As described above, when the possible variable delay value exceeds the allowable variable delay value, the signal transfer system 1 having the signal transfer control apparatus 5b changes the communication path so that the accommodation efficiency is improved, and the low latency of the traffic flow is secured. Furthermore, the signal transfer system 1 is capable of efficiently reducing delay even when the delay may fluctuate in a short cycle.

The constituent elements of the slave station 2, the master station 3, the signal transfer apparatus 4 and the signal transfer control apparatus 5 described above may be partially or entirely configured by hardware or by causing a processor to execute a program.

In addition, when the constituent elements of the signal transfer control apparatus 5 are partially or entirely configured. by causing a processor to execute a program, the program may be recorded on a recording medium to be provided or provided via a network.

REFERENCE SIGNS LIST

1 Signal transfer system
2-1, 2-2 Slave station
3 Master station
4-1 to 4-6 Signal transfer apparatus
5, 51, 5b Signal transfer control apparatus
50 Fixed delay information acquisition unit
51, 56, 58 Communication path calculation unit
52 Setting instruction unit
53 Traffic information acquisition unit
54 Probability density function estimation unit
55 Occurrence probability estimation unit
57 Variable delay value estimation unit

The invention claimed is:

1. A signal transfer control apparatus that performs a control operation to switch a plurality of communication paths constituted by a plurality of signal transfer apparatuses transferring a signal, the signal transfer control apparatus comprising:
a fixed delay information acquisition unit that acquires fixed delay information for each of the plurality of communication paths;
a traffic information acquisition unit that acquires traffic information indicating a traffic volume of each of the plurality of communication paths;
a probability density function estimation unit that estimates a probability density function of the traffic volume of each of the plurality of communication paths based on the traffic information;
an occurrence probability estimation unit that estimates an occurrence probability of variable delay in each of the plurality of communication paths based on the probability density function of each of the plurality of communication paths;
a communication path calculation unit that performs a calculation for specifying a communication path which is highly likely to satisfy a predetermined delay condition based on the occurrence probability of the variable delay in each of the plurality of communication paths and the fixed delay information for each of the plurality of communication paths; and
a setting instruction unit that outputs a setting instruction for switching a transfer destination of the signal to at least any one of the signal transfer apparatuses so that the signal is transferred via the communication path specified by the calculation performed by the communication path calculation unit.

2. A signal transfer control apparatus that performs a control operation to switch a plurality of communication paths constituted by a plurality of signal transfer apparatuses transferring a signal, the signal transfer control apparatus comprising:
a fixed delay information acquisition unit that acquires fixed delay information for each of the plurality of communication paths;
a traffic information acquisition unit that acquires traffic information indicating a traffic volume of each of the plurality of communication paths;
a probability density function estimation unit that estimates a probability density function of a traffic volume of each of the plurality of communication paths based on the traffic information;
a variable delay value estimation unit that estimates a variable delay value in each of the plurality of communication paths based on the probability density function of each of the plurality of communication paths and predetermined burst length information;
a communication path calculation unit that performs a calculation for specifying a communication path which satisfies a predetermined delay condition based on the variable delay value in each of the plurality of communication paths and the fixed delay information for each of the plurality of communication paths; and
a setting instruction unit that outputs a setting instruction for switching a transfer destination of a signal to at least any one of the signal transfer apparatuses so that the signal is transferred via the communication path specified by the calculation performed by the communication path calculation unit.

3. The signal transfer control apparatus according to claim 1, wherein the traffic information acquisition unit acquires, as traffic information, a traffic volume of the signal transfer apparatus having a largest average output traffic volume among the plurality of signal transfer apparatuses.

4. The signal transfer control apparatus according to claim 1, wherein the communication path calculation unit performs the calculation for specifying the communication path based on additivity of a mean and variance of traffic volumes indicated in the traffic information acquired by the traffic information acquisition unit.

5. A signal transfer control method for performing a control operation to switch a plurality of communication paths constituted by a plurality of signal transfer apparatuses transferring a signal, the signal transfer control method comprising:

a fixed delay information acquisition process that acquires fixed delay information for each of the plurality of communication paths;

a traffic information acquisition process that acquires traffic information indicating a traffic volume of each of the plurality of communication paths;

a probability density function estimation process that estimates a probability density function of a traffic volume of each of the plurality of communication paths based on the traffic information;

an occurrence probability estimation process that estimates an occurrence probability of variable delay in each of the plurality of communication paths based on the probability density function of each of the plurality of communication paths;

a communication path calculation process that performs a calculation for specifying a communication path which is highly likely to satisfy a predetermined delay condition based on the occurrence probability of the variable delay in each of the plurality of communication paths and the fixed delay information for each of the plurality of communication paths; and a setting instruction process that outputs a setting instruction for switching a transfer destination of a signal to at least any one of the signal transfer apparatuses so that the signal is transferred via the specified communication path.

6. The signal transfer control method according to claim 5 wherein the traffic information acquisition process acquires, as traffic information, a traffic volume of the signal transfer apparatus having a largest average output traffic volume among the plurality of signal transfer apparatuses.

7. The signal transfer control method according to claim 5, wherein the communication path calculation process performs a calculation for specifying a communication path based on additivity of a mean and variance of traffic volumes indicated in the traffic information acquired by the traffic information acquisition process.

* * * * *